(12) United States Patent
Kurosaki et al.

(10) Patent No.: US 10,644,360 B2
(45) Date of Patent: May 5, 2020

(54) BATTERY MANAGEMENT SYSTEM

(71) Applicant: Panasonic Intellectual Property Management Co., Ltd., Osaka (JP)

(72) Inventors: Yuta Kurosaki, Osaka (JP); Takahiro Kamikawa, Osaka (JP); Etsushi Aga, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 320 days.

(21) Appl. No.: 15/747,267

(22) PCT Filed: Nov. 30, 2016

(86) PCT No.: PCT/JP2016/005022
§ 371 (c)(1),
(2) Date: Jan. 24, 2018

(87) PCT Pub. No.: WO2017/110049
PCT Pub. Date: Jun. 29, 2017

(65) Prior Publication Data
US 2018/0212278 A1    Jul. 26, 2018

(30) Foreign Application Priority Data

Dec. 22, 2015 (JP) ................................. 2015-250114

(51) Int. Cl.
*H01M 10/46* (2006.01)
*H01M 10/42* (2006.01)
(Continued)

(52) U.S. Cl.
CPC ......... *H01M 10/425* (2013.01); *H01M 10/48* (2013.01); *H02J 7/0021* (2013.01); *H02J 7/02* (2013.01); *H01M 2010/4271* (2013.01)

(58) Field of Classification Search
CPC ...... H02J 7/0026; H02J 7/0021; H02J 7/0042; H02J 7/355; H02J 7/0047; H02J 7/0072
(Continued)

(56) References Cited

U.S. PATENT DOCUMENTS

| 2010/0244847 | A1* | 9/2010 | Kudo | .................... | B60L 3/0069 |
| | | | | | 324/433 |
| 2014/0152261 | A1* | 6/2014 | Yamauchi | .......... | G01R 31/3835 |
| | | | | | 320/118 |

(Continued)

FOREIGN PATENT DOCUMENTS

| JP | 3368752 B | 1/2003 |
| WO | 2013/098923 | 7/2013 |

OTHER PUBLICATIONS

International Search Report of PCT application No. PCT/JP2016/005022 dated Feb. 14, 2017.

*Primary Examiner* — Edward Tso
(74) *Attorney, Agent, or Firm* — McDermott Will & Emery LLP

(57) ABSTRACT

A battery management system includes a circuit board having a first region provided with a voltage measuring unit, a second region provided with a controller, a relay region that is disposed at a first insulation distance from the first region and at a second insulation distance from the second region, and a third region provided with an interface connecting unit. The third region is disposed at a third insulation distance from the second region. The third insulation distance is shorter than each of the first and the second insulation distances. The battery management system further includes a first insulating device connecting between the first region and the relay region, a second insulating device connecting between the relay region and the second region, and a third insulating device connecting between the second region and the third region.

10 Claims, 6 Drawing Sheets

(51) Int. Cl.
*H02J 7/02* (2016.01)
*H01M 10/48* (2006.01)
*H02J 7/00* (2006.01)

(58) Field of Classification Search
USPC ........ 320/107, 116, 117, 128, 132, 137, 140
See application file for complete search history.

(56) References Cited

U.S. PATENT DOCUMENTS

2014/0333132 A1    11/2014  Yamauchi et al.
2016/0105054 A1*    4/2016  Horito ................ H01M 10/482
                                                    320/134
2016/0261127 A1*    9/2016  Worry ................ G01R 31/3842

* cited by examiner

US 10,644,360 B2

BATTERY MANAGEMENT SYSTEM

This application is a U.S. national stage application of the PCT International Application No. PCT/JP2016/005022 filed on Nov. 30, 2016, which claims the benefit of foreign priority of Japanese patent application 2015-250114 filed on Dec. 22, 2015, the contents all of which are incorporated herein by reference.

TECHNICAL FIELD

The present disclosure relates to a battery management system for monitoring a battery.

BACKGROUND ART

Reinforced insulation is required for insulation between the primary side and the secondary side of a power supply device to keep the power supply device in a safe state. Reinforced insulation is a single insulating system that provides mechanical and electrical protection on a par with double insulation against electric shocks. The double insulation referred to here is made up of basic insulation, i.e. insulation for basic protection against electric shocks, and supplementary insulation, i.e. independent insulation added to the basic insulation to ensure protection against electric shocks in the case of a defect in the basic insulation. Functional insulation, which is used to ensure proper operation of equipment, is useful for prevention of ignition and combustion. However, this insulation does not provide protection against electric shocks.

International safety standards define insulation distances needed to ensure insulation in consideration of circuit effective voltages and transient voltages. The defined insulation distances include an air clearance, that is the shortest distance between two conducting parts or between a conducting part and a conductive outer surface of equipment measured through air, and creepage distance, that is the shortest distance between two conducting parts or between a conducting part and a conductive outer surface of equipment measured along the surface of an insulator which is in between.

As described in PTL 1 for example, international standards and guidelines stipulate that the insulation distance for a welding power supply with a circuit effective voltage of 400 V should be 5.5 mm or longer in air clearance and 6.3 mm or longer in creepage distance to provide basic insulation. These standards also stipulate that insulation between an input circuit and an output circuit should constitute reinforced insulation or double insulation, and the insulation distance should be twice the basic insulation distance, i.e. an air clearance of 11 mm or longer and a creepage distance of 12.6 mm or longer.

PTL 2 discloses a method of ensuring the expandability of a battery system that includes a plurality of series-connected battery modules each having a plurality of battery cells. The battery modules have photo-couplers or other insulating devices that are used to communicate information about voltages and other measurements of the respective modules with an external management unit for the battery system. A housing for each battery module has an insulation sheet and a spatial distance between the housing and the battery cells contained inside and thereby maintains insulation from the battery cells.

CITATION LIST

Patent Literature

PTL 1: Japanese Patent No. 3368752
PTL 2: PCT International Publication No. 2013/098923

SUMMARY OF THE INVENTION

Technical Problem

If a battery management system for managing an operating state of a high-voltage battery is implemented on a circuit board, an air clearance corresponds to a distance between two adjacent conductive patterns on the circuit board. A creepage distance corresponds to a distance between two adjacent conductive patterns on the circuit board, wherein the distance is measured along a surface of an insulating device disposed over a gap between the conductive patterns. Accordingly, in general, the air clearance between a conductive pattern at a primary side and a conductive pattern at a secondary side in the battery management system needs to be increased with a rise in the voltage of the battery under management. In order for the distance between the adjacent conductive patterns to be lengthened, the space between a primary-side terminal and a secondary-side terminal of the insulating device needs to be increased.

If a battery used in a power storage system has high voltage and/or the power storage system is connected with a utility grid in a non-insulated manner and faces the assumed risk of receiving a transient high voltage, the power storage system needs to include an insulating device having a long space between terminals. For example, if the power storage system is connected with an electric circuit of overvoltage category III with an alternating current (AC) voltage of 400 V in a non-insulated manner, the power storage system needs to be provided with an air clearance of 11 mm or longer by reinforced insulation. At present, commercially available insulating devices generally have up to a little less than 9 mm in their space between terminals. Insulating devices with a terminal interspace longer than this length are very expensive. A configuration that implements reinforced insulation with a single insulating device results in an increase in system cost. Thus, it is desirable to have a battery management system that can implement insulation protection more effectively through use of a commercially available general insulating device.

Solution to Problem

A battery management system according to the present disclosure includes: a voltage measuring unit to measure a voltage of a battery; a controller to output signals in accordance with data sent from the voltage measuring unit; an interface connecting unit to let the controller communicate with an external unit; and a circuit board having a first region provided with the voltage measuring unit, a second region provided with the controller, a third region provided with the interface connecting unit, and a relay region that is disposed at a predetermined first insulation distance from the first region and at a predetermined second insulation distance from the second region. A ground (GND) potential for the first region and a GND potential for the second region are mutually independent potentials. The battery management system further includes a first insulating device connecting between the first region and the relay region facing each other through the first insulation distance. The first insulating device is configured to transmit data on the voltage of the battery measured by the voltage measuring unit to the relay region. The battery management system further includes a second insulating device connecting between the relay region and the second region facing each other through the second insulation distance. The second insulating device is configured to transmit data on the voltage of the battery transmitted to the relay region by the first insulating device to the second region. An insulation distance between the first region and the second region is defined by the first insulating device and the second insulating device.

Advantageous Effect of Invention

The battery management system according to the present disclosure can implement insulation protection more effectively through use of a commercially available general insulating device.

DESCRIPTION OF EMBODIMENT

An exemplary embodiment of the present disclosure will now be described in detail with reference to the accompanying drawings. A battery management system for managing an operating state of a high-voltage battery is described hereafter and this description is provided for purposes of illustration.

Shapes, dimensions, voltages, positional relationships, and other particulars described below are provided for purposes of illustration and may be changed as appropriate depending on specifications of battery management systems and other requirements. In all the drawings, identical or equivalent components are denoted by identical reference signs, and redundant descriptions thereof will be omitted.

Figure 1:
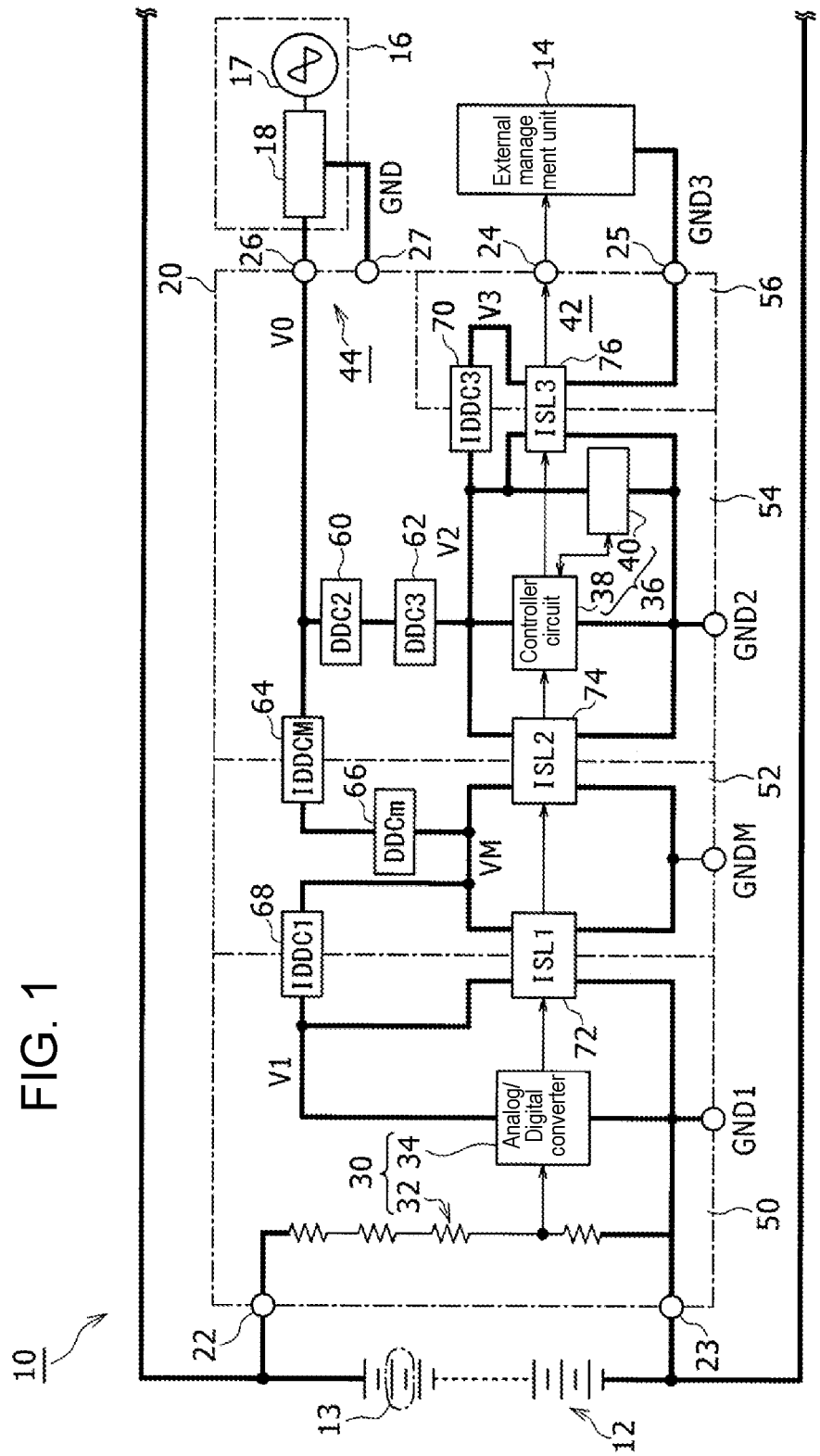
FIG. 1 is a block diagram of a power supply device including a battery management system according to the present disclosure.
Figure 2:
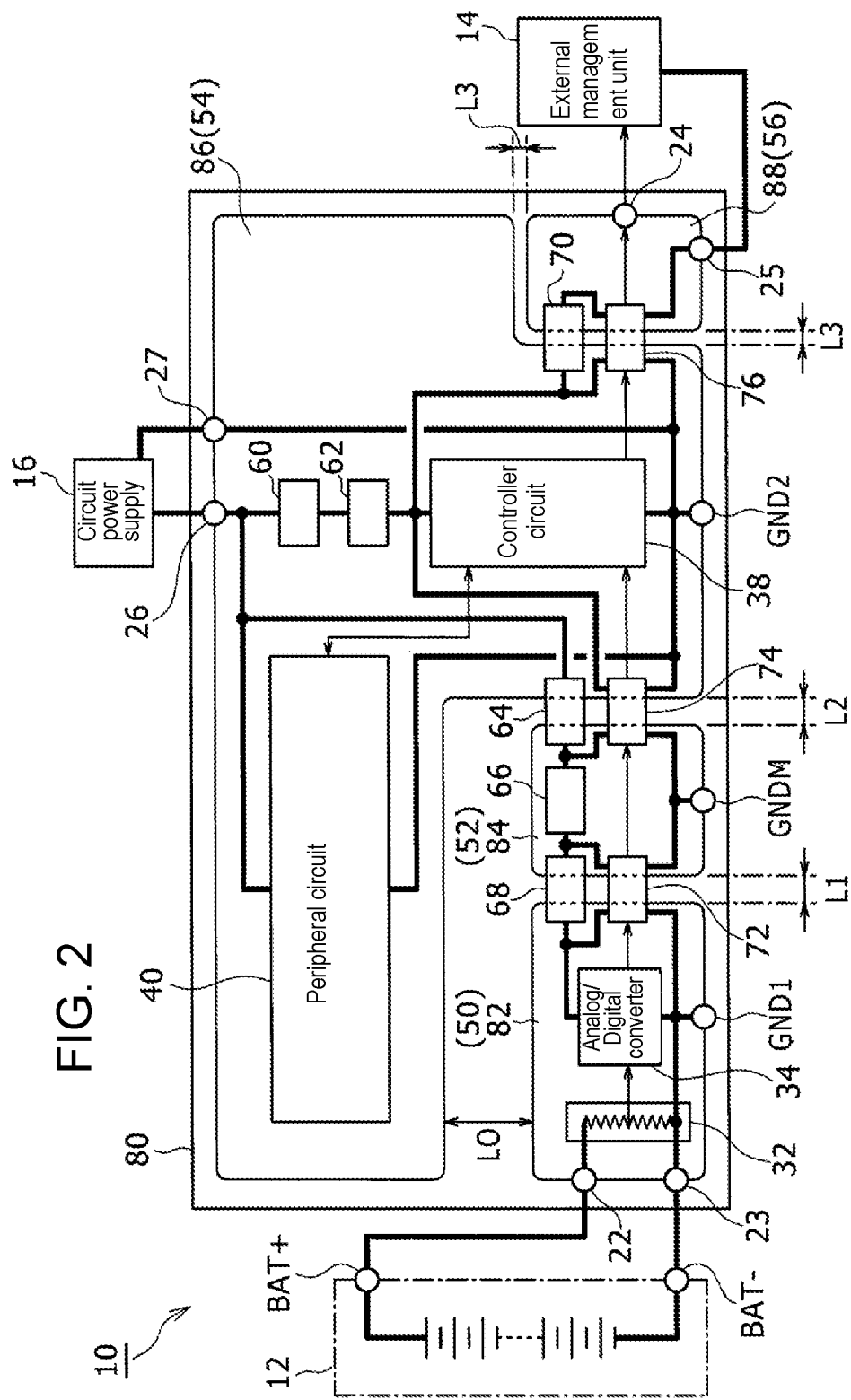
FIG. 2 is a drawing illustrating a circuit board used in the battery management system in FIG. 1.

FIG. 1 is a block diagram of power supply device 10 in a power storage system that is connected with a utility grid by a power conditioner (not shown) and configured to perform peak shaving, frequency regulation, and other operation using a storage battery. Power supply device 10 includes battery 12, i.e. a high-voltage storage battery, battery management system 20, external management unit 14, i.e. an external unit for battery management system 20, and circuit power supply 16 that supplies circuit driving electric power to battery management system 20. FIG. 2 illustrates a configuration of circuit board 80 included in battery management system 20 shown in FIG. 1.

Battery 12 is a secondary battery that can be charged and discharged. Battery 12 is a high-voltage battery that includes battery modules connected in series and/or parallel and thus can output high-voltage and strong electric current necessary for an external electrical apparatus. Each of the battery modules is made up of a plurality of series- or parallel-connected battery cells 13. In FIGS. 1 and 2, illustration of parallel-connected parts is omitted. The high voltage is a voltage of several hundred volts or greater and ranges from about 800 V to about 1,000 V, for example. Hereinafter, a voltage applied across terminals of battery 12 is set to about 800 V. A voltage applied across terminals of battery cell 13 varies with the type of battery cell 13 and ranges from about 1 V to about 4 V. Examples of battery cells 13 include lithium ion batteries and nickel metal hydride batteries.

The two terminals of battery 12 for battery management system 20 according to the present disclosure are connected with the utility grid by the power conditioner (not shown) in a non-insulated manner. Thus, in consideration of transient voltage that can be applied and other conditions, the insulation distance between battery 12 that constitutes a primary circuit and contact parts in a secondary circuit should be 14 mm or larger in air clearance.

External management unit 14 is an external control unit connected to battery management system 20. In response to data about an operating state of battery 12 sent from battery management system 20, the external management unit controls charging, discharging, and other work on battery 12 through the power conditioner (not shown), for example. External management unit 14 operates at a voltage suitable to a circuit configured in external management unit 14. The voltage is about 5 V, for example.

Circuit power supply 16 is a direct-current (DC) power supply that is separate from high-voltage battery 12 and designed to supply circuit driving electric power for driving a circuit part of battery management system 20. In this example, DC power with a voltage of about 24 V is supplied to battery management system 20. Circuit power supply 16 includes alternating-current (AC) power supply 17 and AC/DC converter 18. AC power supply 17 may be a commercial power supply with a frequency of 50 Hz or 60 Hz and an effective voltage of 100 V. AC/DC converter 18 is a power converter used to convert 100 V, i.e. the effective voltage of AC power supply 17, into a DC voltage of 24 V. The frequency and voltage quantities described above are provided for purposes of illustration and may be replaced with other quantities. Circuit power supply 16 may be an external low-voltage power storage device.

Battery management system 20 includes terminals 22, 23 connected to battery 12, terminals 24, 25 connected to external management unit 14, and terminals 26, 27 connected to circuit power supply 16. Out of these terminals, terminals 24, 25, 26, 27 are contact parts. A ground (GND) potential for external management unit 14 and a GND potential for circuit power supply 16 are mutually independent potentials. A relationship between these GND potentials and a GND potential for battery management system 20 will be described later.

If battery management system 20 is assumed to be a single power supply circuit, a voltage across terminals 22, 23 corresponds to a voltage on a primary side and a voltage across terminals 24, 25 corresponds to a voltage on a secondary side. The primary-side voltage is about 800 V, i.e. the voltage applied across the terminals of battery 12, whereas the secondary-side voltage is about 5 V, i.e. the operating voltage of external management unit 14.

Battery management system 20 includes voltage measuring unit 30, controller 36, interface connecting unit 42, circuit power supply connecting unit 44 to connect with circuit power supply 16, and circuit board 80 provided with these elements. Circuit board 80 will be detailed later with reference to FIG. 2.

Voltage measuring unit 30 includes voltage dividing resistor part 32 and analog/digital converter 34 and is used to measure the voltage of battery 12. Voltage dividing resistor part 32 is a group of series resistors designed to regulate the voltage applied across the terminals of battery 12 to a voltage suitable for an operating range of analog/digital converter 34. Both ends of voltage dividing resistor part 32 are connected between terminal 22 and terminal 23 that are connected to a positive electrode (BAT+) and a negative electrode (BAT−) of battery 12, respectively. An intermediate terminal of voltage dividing resistor part 32 is connected to an input terminal of analog/digital converter 34. The intermediate terminal is used to output a divided voltage corresponding to the voltage across the terminals of battery 12. Analog/digital converter 34 converts analog data on the divided voltage corresponding to the voltage across the terminals of battery 12, which is output from the intermediate terminal of voltage dividing resistor part 32, into a digital signal. Analog/digital converter 34 may be an analog-to-digital converter circuit with 16 bits of resolution, for example.

Voltage measuring unit 30 measures the divided voltage corresponding to the voltage across the terminals of battery 12 rather than measuring a voltage associated with battery cells 13 that constitute battery 12. Voltage measuring unit 30 can transmit information on the voltage corresponding to the voltage across the terminals of battery 12 to external management unit 14 in a shorter time as compared to the method of determining the voltage applied across the terminals of battery 12 based on a result of measurement of the voltage associated with each battery cell 13. Consequently, the overall power storage system can be controlled more promptly in response to the operating state of battery 12.

Controller 36 includes controller circuit 38 and peripheral circuit 40 and is used to output signals in accordance with data sent from voltage measuring unit 30. Controller circuit 38 outputs a digital signal indicating the operating state of battery 12 in accordance with a digital signal output from voltage measuring unit 30. Controller circuit 38 may be a suitable microprocessor. Peripheral circuit 40 communicates with controller circuit 38 and assists controller circuit 38 in operating. For example, peripheral circuit 40 includes a circuit for processing various signals and a communication circuit.

Interface connecting unit 42 modifies a signal output from controller 36 into a signal suitable for processing at external management unit 14 and transmits the modified signal. In FIG. 1, terminals 24, 25 and wiring connected to them are shown. The interface connecting unit may have an interface circuit that includes a suitable protection circuit if necessary, for example.

Circuit power supply connecting unit 44 receives circuit driving electric power from circuit power supply 16. In FIG. 1, terminals 26, 27 and wiring connected to them are shown. The circuit power supply connecting unit may have an interface circuit that includes a suitable protection circuit if necessary.

Battery management system 20 is divided into first region 50, relay region 52, second region 54, and third region 56 that have different respective reference potentials. The reference potentials for these regions are GND potentials, i.e. GND1 for first region 50, GNDM for relay region 52, GND2 for second region 54, and GND3 for third region 56, that are independent of one another. In first region 50, voltage measuring unit 30 is disposed. In second region 54, controller 36 and circuit power supply connecting unit 44 are disposed. In third region 56, interface connecting unit 42 is disposed. Relay region 52 is a region disposed between first and second regions 50 and 54.

Respective operating voltages for these regions are produced through a plurality of voltage converters from predetermined circuit voltage V0, that is a voltage of circuit driving electric power supplied from circuit power supply 16 to circuit power supply connecting unit 44. Operating voltage V2 for second region 54 is produced from circuit voltage V0 through two voltage converters 60, 62 respectively shown with DDC2, DDC3. Operating voltage VM for relay region 52 is produced from circuit voltage V0 through two voltage converters 64, 66 respectively shown with IDDCM, DDCm. Operating voltage V1 for first region 50 is produced from operating voltage VM of relay region 52 through voltage converter 68 shown with IDDC1. Operating voltage V3 for third region 56 is produced from operating voltage V2 of second region 54 through voltage converter 70 shown with IDDC3.

The operating voltage for first region 50 ranges from V1 to GND1. Similarly, the operating voltage for relay region 52 ranges from VM to GNDM; the operating voltage for second region 54 ranges from V2 to GND2; and the operating voltage for third region 56 ranges from V3 to GND3. By way of example, the operating voltage ranges are: V2=3.3 V, VM=3.3 V, V1=3.3 V, and V3=3.3 V, with predetermined circuit voltage V0 set to 24 V. These voltages are provided for purposes of illustration and may be changed as appropriate depending on specifications of power supply device 10 and battery management system 20.

Voltage converters 60, 62 operate in the second region and voltage converter 66 operates in relay region 52. Examples of these voltage converters 60, 62, 66 include non-isolated DC-DC converters using series regulator technique or other methods. Meanwhile, voltage converter 64 operates in a span extending from second region 54 to relay region 52; voltage converter 68 operates in a span extending from relay region 52 to first region 50; and voltage converter 70 operates in a span extending from second region 54 to third region 56. Examples of these voltage converters 64, 68, 70 include isolated-type DC-DC converters using transformers because these converters each operate in a span of different operating ranges.

Since relay region 52 is provided, electric power needs to be supplied to circuitry installed in relay region 52. With reference to FIG. 1, electric power is supplied from second region 54 to relay region 52 via isolated-type voltage converter 64. Electric power is then supplied from relay region 52 to first region 50 via isolated-type voltage converter 68.

Electric power for first region 50 may be produced at battery 12. However, this conceivable option disadvantageously entails use of a high withstand-voltage part in a voltage conversion circuit for lowering the voltage across the terminals of battery 12 to the operating voltage for first region 50 and an electric power loss because of the high voltage applied across the terminals of battery 12. The power supply device may adopt another power production method and directly supply electric power from second region 54 to first region 50 by bypassing relay region 52. In this case, with reference to FIG. 1, insulation distance maintained by two voltage converters 64 and 68 needs to be maintained by one isolated-type voltage converter that is installed in a span extending from second region 54 to first region 50.

In FIG. 1, power supply wiring is indicated with thick solid lines. Meanwhile, wiring for signals transmitted from voltage measuring unit 30 to external management unit 14 via controller 36 and interface connecting unit 42 is indicated with thin solid arrow lines.

Signals transmitted along the signal wiring travel through first region 50, relay region 52, second region 54, and third region 56 that have mutually different operating voltage ranges. Thus, insulating devices, i.e. isolated-type signal transmitters, are disposed at boundaries between the respective adjacent regions. First insulating device 72 shown with ISL1 is disposed between first region 50 and relay region 52. Similarly, second insulating device 74 shown with ISL2 is disposed between relay region 52 and second region 54. Third insulating device 76 shown with ISL3 is disposed between second and third regions 54 and 56.

Analog/digital converter 34 and first insulating device 72 that transmits digital data converted by analog/digital converter 34 may be contained in a single package as an integrated circuit (IC) for battery voltage measurement. Such an IC has already been put to practical use. Analog/digital converter 34 and voltage converter 68 may be contained in a single package as an IC for battery voltage measurement. Such an IC has already been put to practical use. Analog/digital converter 34, first insulating device 72, and voltage converter 68 may be contained in a single package as an IC for battery voltage measurement. Such an IC has already been put to practical use. An insulating device and an isolated-type DC-DC converter may be contained in a single package as an insulating device IC, and such an IC has already been put to practical use. This insulating device IC may serve as first insulating device 72 and voltage converter 68 for the first region, for example. Specifications about insulation distances for these parts will be described later.

FIG. 2 is a drawing illustrating the configuration of circuit board 80 of battery management system 20 included in power supply device 10 shown in FIG. 1. In circuit board 80, conductor patterns are formed into predetermined shapes on insulating substrate 81 (refer to FIGS. 3 and 4) and circuit components are mounted on the predetermined conductor patterns. Circuit board 80 has four conductor regions that are electrically isolated from one another. FIG. 2 shows the four conductor regions as regions that are surrounded with outermost contour lines of the conductor patterns in the respective conductor regions. First conductor region 82 is a conductor region corresponding to first region 50 and is provided with voltage dividing resistor part 32 and analog/digital converter 34 that constitute voltage measuring unit 30. Relay conductor region 84 is a conductor region corresponding to relay region 52. Second conductor region 86 is a conductor region corresponding to second region 54 and is provided with controller circuit 38 and peripheral circuit 40 that constitute controller 36. Third conductor region 88 is a conductor region corresponding to third region 56.

Circuit board 80 is rectangular in overall shape. Second region 54 on which controller 36 is mounted is larger in area than first region 50, relay region 52, and third region 56. Second region 54 accounts for at least half of a total area of circuit board 80. First region 50 and relay region 52 are disposed at one recess on an outline of second region 54. Third region 56 is disposed at a recess of second region 54 other than the recess at which first and relay regions 50 and 52 are disposed.

First and relay conductor regions 82 and 84 are electrically isolated from each other by first insulation distance L1. Relay and second conductor regions 84 and 86 are electrically isolated from each other by second insulation distance L2. Second and third conductor regions 86 and 88 are electrically isolated from each other by third insulation distance L3. Second and first conductor regions 86 and 82, i.e. an adjacent gap (a shortest interval) between first and second regions 50 and 52, are electrically isolated from each other by fourth insulation distance L0.

In battery management system 20 according to the present disclosure, a total of the insulation distances is required to satisfy an insulation distance of 14 mm or longer that is specified based on safety standards in consideration of a voltage of about 800 V applied across the terminals of battery 12 and a transient voltage that may be applied from the utility grid. For example, first insulation distance L1 is a length corresponding to a distance between terminals of first insulating device 72, and second insulation distance L2 is a length corresponding to a distance between terminals of second insulating device 74. In the present disclosure, first and second insulation distances L1 and L2 are each 7 mm. Third insulation distance L3 is a minimum distance between respective patterns in second and third conductor regions 86 and 88, and is set to 1 mm, which is shorter than each of first and second insulation distances L1 and L2. Fourth insulation distance L0 is much longer than first and second insulation distances L1 and L2, and is set to about 20 mm so that L0>L1+L2. Effects produced by these dimensions will be described later.

Voltage converter 68, i.e. an isolated-type DC-DC converter, and first insulating device 72 are disposed between first and relay conductor regions 82 and 84 that face each other through first insulation distance L1. Similarly, voltage converter 64, i.e. an isolated-type DC-DC converter, and second insulating device 74 are disposed between relay and second conductor regions 84 and 86 that face each other through second insulation distance L2. Voltage converter 70, i.e. an isolated-type DC-DC converter, and third insulating device 76 are disposed between second and third conductor regions 86 and 88 that face each other through third insulation distance L3.

Voltage converter 64 converts operating voltage V2 for second region 54, i.e. a primary side voltage, into operating voltage VM for relay region 52, i.e. a secondary side voltage. Similarly, voltage converter 68 converts operating voltage VM for relay region 52, i.e. a primary side voltage, into operating voltage V1 for first region 50, i.e. a secondary side voltage. Voltage converter 70 converts operating voltage V2 for second region 54, i.e. a primary side voltage, into operating voltage V3 for third region 56, i.e. a secondary side voltage. Voltage converter 64 is required to have a structure that maintains insulation distance L2, whereas voltage converter 68 is required to have a structure that maintains insulation distance L1. Voltage converter 70 will be detailed later.

Figure 3:
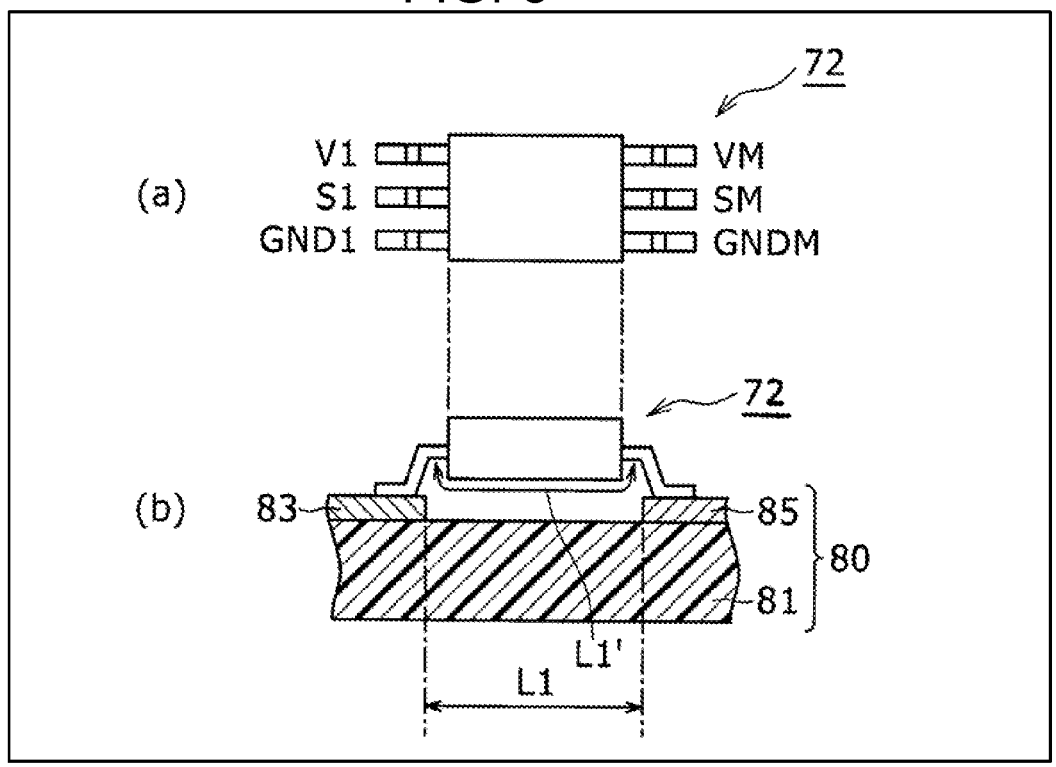
FIG. 3 is a drawing illustrating a first insulating device in FIG. 2.
Figure 4:
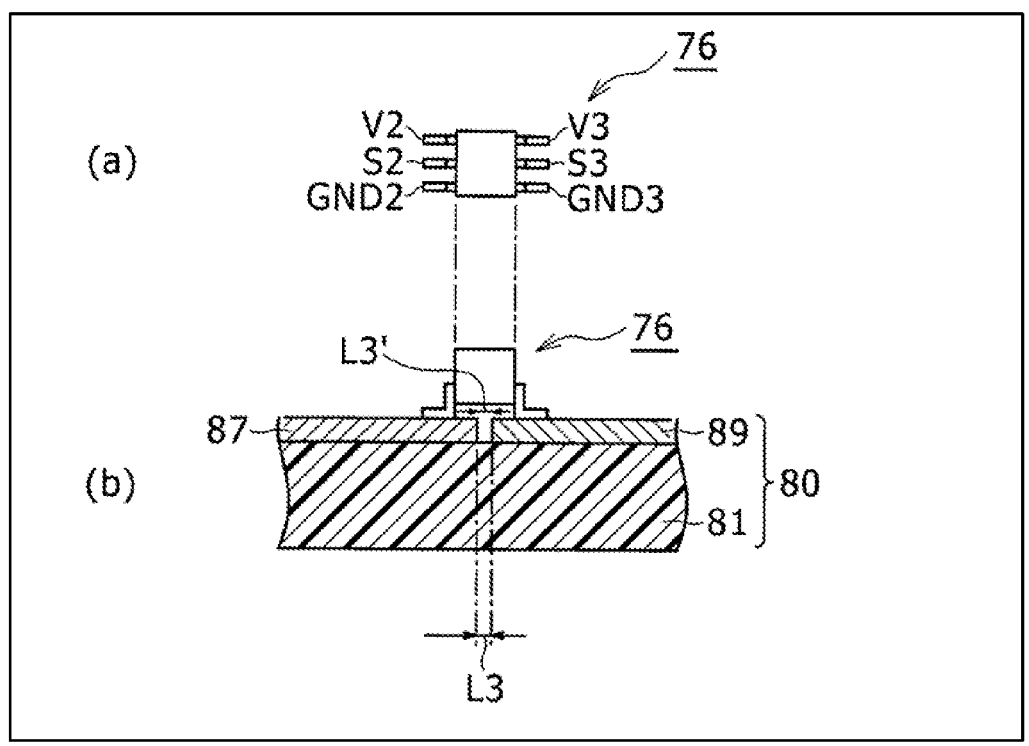
FIG. 4 is a drawing illustrating a third insulating device in FIG. 2.

With reference to FIGS. 3 and 4, first and third insulating devices 72 and 76 will now be described. Parts (a) of these drawings are plan views of the devices. Parts (b) of these drawings are side views of the devices that are each mounted on circuit board 80. The drawings each show a cross-sectional view of circuit board 80. FIGS. 3 and 4 illustrate first and third insulating devices 72 and 76 respectively, which are each used for 1-bit signal transmission. For multi-bit signal transmission, each of these devices may be replaced with an insulating device for multi-bit signal transmission or a plurality of insulating devices for 1-bit signal transmission.

In FIG. 3, first insulating device 72 is a package that sticks out three primary-side leads, i.e. a lead for V1, a lead for GND1, and a lead for primary-side signals 51, as well as three secondary-side leads, i.e. a lead for VM, a lead for GNDM, and a lead for secondary-side signals SM. In the package, an insulating device and a peripheral circuit for the insulating device are disposed. First insulating device 72 may be a digital isolator that transmits signals through magnetic coupling between first and secondary sides or an opt-isolated photo-coupler that incorporates a photodiode on the primary side and a phototransistor on the secondary side.

A section of circuit board 80 on which first insulating device 72 is mounted includes insulating substrate 81, conductor pattern 83 disposed in first conductor region 82 corresponding to first region 50, and conductor pattern 85 disposed in relay conductor region 84 corresponding to relay region 52. Insulating substrate 81 may be a glass epoxy substrate. Conductor patterns 83, 85 may be made from copper or other conductive foil that is formed into respective predetermined shapes. First insulating device 72 is mounted on circuit board 80, with the three primary-side leads of first insulating device 72 soldered to conductor pattern 83 and the three secondary-side leads of first insulating device 72 soldered to conductor pattern 85.

In part (b) of FIG. 3, an air clearance, i.e. one of insulation distances, of the device is a shortest spatial distance between conductor patterns 83 and 85 facing each other and the air clearance corresponds to first insulation distance L1. Since L1 is 7 mm, the air clearance is 7 mm. A creepage distance, i.e. one of insulation distances, of the device is a distance extending from the primary-side leads to the secondary-side leads along a surface of the package, i.e. an insulator in first insulating device 72 mounted on circuit board 80. In part (b) of FIG. 3, the creepage distance is indicated with L1'. Since L1 and L1' shown in an example of part (b) of FIG. 3 are substantially equal in distance, L1 represents the insulation distance of the device hereinafter.

L1 is substantially equal to a space between the primary-side leads and the secondary-side leads of first insulating device 72. At present, digital isolators and photo-couplers that are commercially available as insulating devices generally have up to a little less than 9 mm in their space between primary- and secondary-side leads. First insulating device 72 may be a commercially available digital isolator or a photo-coupler that measures 7 mm in space between the primary- and secondary-side leads and thus meets a required dielectric withstand voltage.

Second insulating device 74 is an insulating device that is identical to first insulating device 72 in structure and dimensions. The distance between the terminals of second insulating device 74 is equivalent to second insulation distance L2, which is equal to first insulation distance L1. Consequently, in common with the first insulating device 72, second insulating device 74 may be a commercially available digital isolator or a photo-coupler that measures 7 mm in space between the primary- and secondary-side leads and thus meets a required dielectric withstand voltage.

In FIG. 4, third insulating device 76 is a package that sticks out three primary-side leads, i.e. a lead for V2, a lead for GND2, and a lead for primary-side signals S2, as well as three secondary-side leads, i.e. a lead for V3, a lead for GND3, and a lead for secondary-side signals S3. In the package, an insulating device and a peripheral circuit for the insulating device are disposed. Third insulating device 76 may be a product that is smaller than first insulating device 72.

A section of circuit board 80 on which third insulating device 76 is mounted includes insulating substrate 81, conductor pattern 87 disposed in second conductor region 86 corresponding to second region 54, and conductor pattern 89 disposed in third conductor region 88 corresponding to third region 56. Details of insulating substrate 81 and conductor patterns 87, 89 are the same as the details described for first insulating device 72 and thus detailed descriptions thereof are omitted. Third insulating device 76 is mounted on circuit board 80, with the three primary-side leads of third insulating device 76 soldered to conductor pattern 87 and the three secondary-side leads of third insulating device 76 soldered to conductor pattern 89.

In part (b) of FIG. 4, an air clearance, i.e. one of insulation distances, of the device is a shortest spatial distance between conductor patterns 87 and 89 facing each other and the air clearance corresponds with third insulation distance L3. Since L3 is 1 mm, the air clearance is 1 mm. A creepage distance, i.e. one of insulation distances, of the device is a distance extending from conductor pattern 87 to conductor pattern 89 through a gap between the patterns in circuit board 80 on which third insulating device 76 is mounted. In part (b) of FIG. 4, the creepage distance is indicated with L3'. Since L3 and L3' shown in an example of part (b) of FIG. 4 are substantially equal in distance, L3 represents the insulation distance of the device hereinafter.

Although L3 is 1 mm, L3 can be practically disregarded because insulation distances L1 and L2 maintain an insulation distance of 14 mm that is required to be satisfied. Thus, connection between second region 54 and external management unit 14 may be non-insulated. As a result, spacing between the primary-side leads and the secondary-side leads of third insulating device 76 may be disregarded. At present, digital isolators and photo-couplers that are commercially available as small insulating devices and have about 4 mm in their space between primary- and secondary-side leads are inexpensive and affordable as compared to those that are provided with a lead interspace of 7 mm and a high dielectric withstand voltage for first insulating device 72. Third insulating device 76 may be a commercially available inexpensive digital isolator or a photo-coupler that measures about 4 mm in space between the primary- and secondary-side leads. Examples of voltage converter 70, owing to disregard of required insulation distance, include commercially available small isolated-type DC-DC converter modules.

Figure 5:
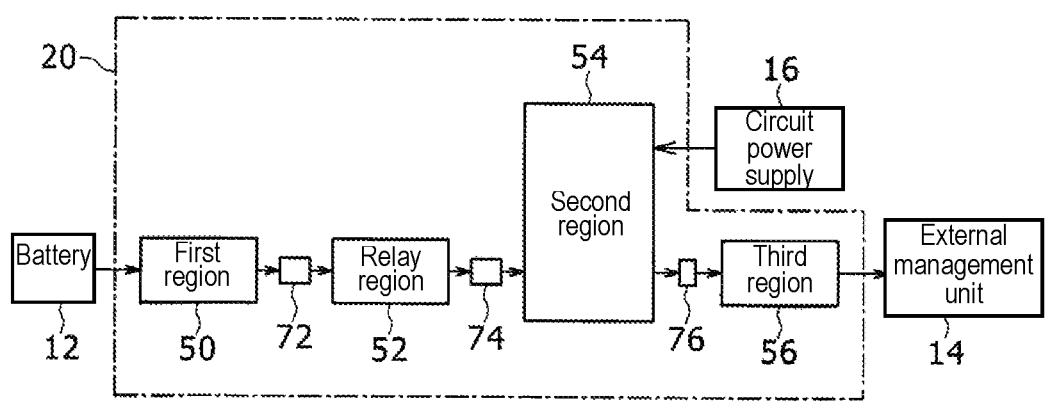
FIG. 5 is a drawing illustrating effects produced by the battery management system according to the present disclosure.
Figure 6:
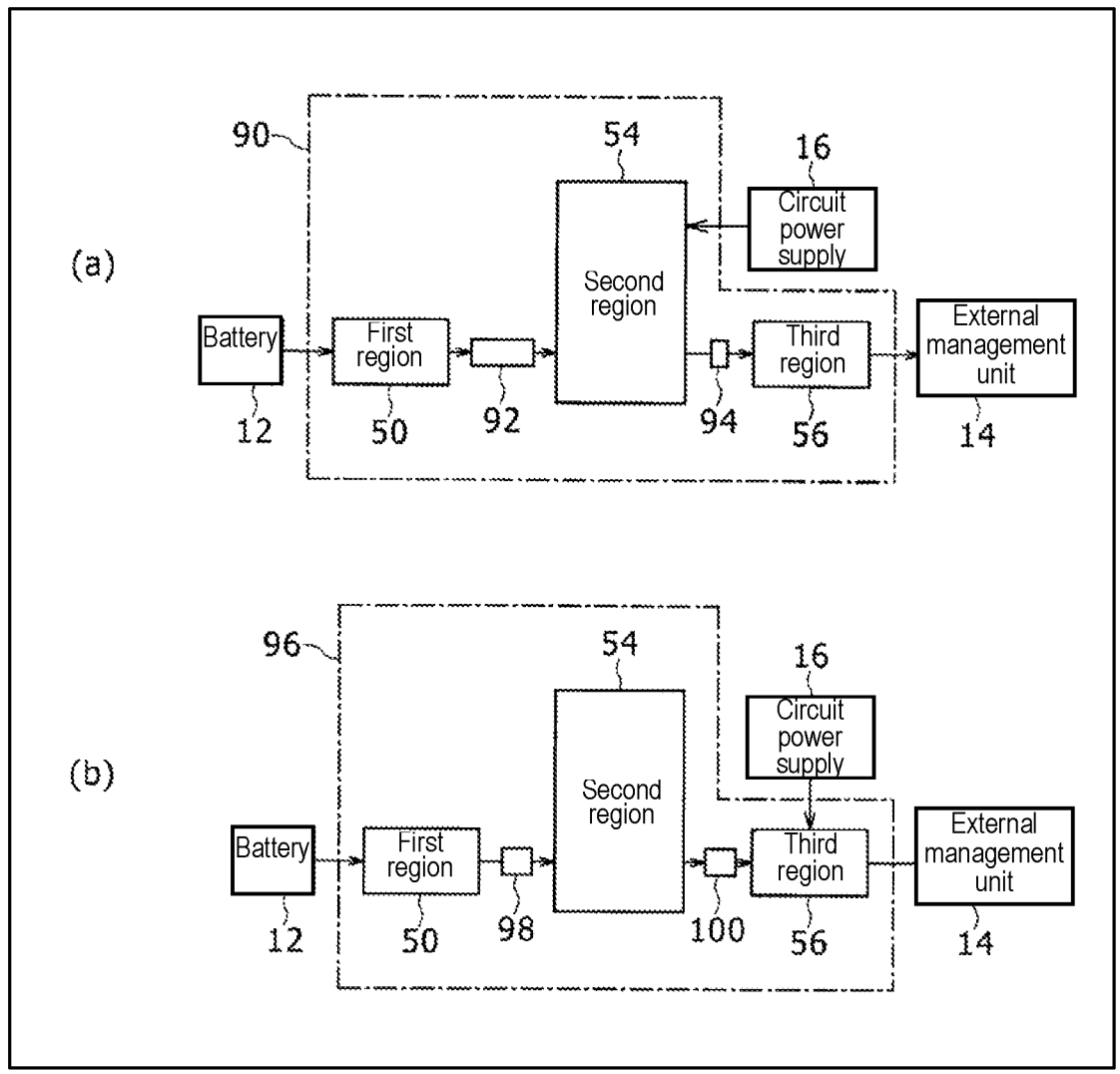
FIG. 6 illustrates two examples of battery management systems according to the conventional art, taken as comparative examples of FIG. 5.

With reference to FIGS. 5 and 6, effects produced by battery management system 20 configured as described above will now be described. FIG. 5 is a simplified version of the block diagram of FIG. 1.

In consideration of an environment in which battery management system 20 according to the present disclosure is installed, the air clearance and the creepage distance that provide reinforced insulation for the battery management system need to be 14 mm or longer as described above. In FIG. 5, first insulating device 72 is a commercially available digital isolator or a photo-coupler that measures 7 mm in space between the primary- and secondary-side leads. Thus, an air clearance of and a creepage distance of 7 mm are maintained between first and relay regions 50 and 52.

Second insulating device 74, which is identical to first insulating device 72, is a commercially available digital isolator or a photo-coupler that measures 7 mm in space between the primary- and secondary-side leads. The distance between relay and second regions 52 and 54 is second insulation distance L2, which is equal to first insulation distance L1. Thus, an air clearance of and a creepage distance of 7 mm are maintained between relay and second regions 52 and 54. In this example, fourth insulation distance L0 is set to about 20 mm so that L0>L1+L2. Thus, interposition of relay region 52 between first and second regions 50 and 54 provides two pieces of insulation that each constitute an air clearance of and a creepage distance of 7 mm. The two pieces of insulation are equivalent to a total insulation distance of 14 mm and satisfy reinforced insulation conditions required for the environment in which battery management system 20 according to the present disclosure is installed. As a result, battery management system 20 is protected by reinforced insulation. In the battery management system, first and second insulating devices 72 and 74 are each a commercially available digital isolator or a photo-coupler that measures 7 mm in space between the primary- and secondary-side leads, for example.

Second region 54 at the secondary side is protected by reinforced insulation against a DC high voltage of 800 V at the primary side and a transient high voltage that may be applied from the utility grid. Thus, connection between second and third conductor regions 86 and 88 requires no special protection against electric shock and may be provided with functional insulation or no insulation. Hence, with third insulation distance L3 set to 1 mm, third insulating device 76 is a commercially available inexpensive digital isolator or a photo-coupler that measures about 4 mm in space between the primary- and secondary-side leads, for example.

The following description is given of specifications about the insulation distance for an IC for battery voltage measurement that contains analog/digital converter 34 and first insulating device 72 in a single package. Such an IC for battery voltage measurement may be used for insulation between first and relay regions 50 and 52 with proviso that the IC includes built-in first insulating device 72 having first insulation distance L1. An IC for battery voltage measurement that contains analog/digital converter 34 and voltage converter 68 in a single package may be used for the supply of electric power from relay region 52 to first region 50 with proviso that the IC includes built-in voltage converter 68 having first insulation distance L1. An IC for battery voltage measurement that contains analog/digital converter 34, first insulating device 72, and voltage converter 68 in a single package may be used for insulation between first and relay regions 50 and 52 and the supply of electric power from relay region 52 to first region 50 with proviso that first insulating device 72 and voltage converter 68 contained in the IC each have first insulation distance L1.

FIG. 6 illustrates two examples of battery management systems without relay region 52 according to the conventional art. The systems are each designed to safeguard the secondary side from a DC high voltage at the primary side. In part (a) of FIG. 6, i.e. the first of the drawings, reinforced insulating device 92 is disposed between first region 50 and second region 54. In a system installation environment according to the present disclosure, reinforced insulating device 92 is required to include an insulating device IC that measures at least 14 mm in space between the primary- and secondary-side leads. Reinforced insulating device 92 with a lead interspace of 14 mm or longer is not in common use at present and adoption of such a device can result in an increase in system cost. A system that includes reinforced insulating device 92 provides second region 54 at the secondary side with protection by reinforced insulation. As a result, functional insulation is satisfactory for insulation between second conductor region 86 and third conductor region 88, and insulating device 94 may be a device identical to third insulating device 76 in FIG. 5.

In part (b) of FIG. 6, i.e. the second of the drawings, basic insulating device 98 is disposed between first region 50 and second region 54, and supplementary insulating device 100 is disposed between second region 54 and third region 56. Basic and supplementary insulating devices 98 and 100 may be devices identical to first and second insulating devices 72 and 74 of FIG. 5. Second region 54 in this example, as compared to that in FIG. 5, is not protected by reinforced insulation. Thus, circuit power supply 16 is required to supply power via the third region. Consideration needs to be given to isolation provided for signals transmitted downstream from second region 54. As a result, additional insulation for electric shock prevention needs to be provided for a connection between controller 36 in second region 54 and external management unit 14, and if the connection is established by Ethernet (registered trademark), providing the transmission line with satisfactory insulation is difficult.

Battery management system 20 according to the present disclosure includes relay region 52 and thus can maintain reinforced insulation through use of a commercially available general digital isolator or a photo-coupler. Since second region 54 is protected by reinforced insulation, protection at a level of functional insulation is satisfactory for signals transmitted downstream from second region 54, and external management unit 14 may be provided with no insulation if doing so is allowed in a configuration of the circuit. In particular, there may be a case where second region 54 is connected with a plurality of external units via a plurality of interfaces. In such cases, even if second region 54 is connected to a plurality of third regions 56, all of the plurality of third regions 56 may be provided with functional insulation or no insulation because second region 54 has already been protected by reinforced insulation. In addition, the battery management system transmits data on the voltage across the terminals of battery 12 to external management unit 14 and thus can manage the operating state of battery 12 faster than cases where data on the voltage of battery cells 13 is transmitted to external management unit 14. In this way, the battery management system can implement insulation protection more effectively through use of a commercially available

The invention claimed is:

1. A battery management system comprising:
a voltage measuring unit to measure a voltage of a battery;
a controller to output signals in accordance with data sent from the voltage measuring unit;
an interface connecting unit to let the controller communicate with an external unit;
a circuit board having a first region provided with the voltage measuring unit, a second region provided with the controller, a third region provided with the interface connecting unit, and a relay region that is disposed at a predetermined first insulation distance from the first region and at a predetermined second insulation distance from the second region, a ground (GND) potential for the first region and a GND potential for the second region being mutually independent potentials;
a first insulating device connecting between the first region and the relay region facing each other through the first insulation distance, the first insulating device being configured to transmit data on the voltage of the battery measured by the voltage measuring unit to the relay region; and
a second insulating device connecting between the relay region and the second region facing each other through the second insulation distance, the second insulating device being configured to transmit data on the voltage of the battery transmitted to the relay region by the first insulating device to the second region, wherein an insulation distance between the first region and the second region is defined by the first insulating device and the second insulating device.

2. The battery management system according to claim 1, wherein the second region has a circuit power supply connecting unit to receive circuit driving electric power with a predetermined circuit voltage lower than the voltage of the battery from a circuit power supply that is separate from the battery.

3. The battery management system according to claim 2, further comprising:
- a voltage converter for the second region, the voltage converter being configured to convert the circuit voltage into an operating voltage for the second region;
- a voltage converter for the relay region, the voltage converter being configured to convert the circuit voltage into an operating voltage for the relay region; and
- a voltage converter for the first region, the voltage converter being configured to convert the operating voltage for the relay region into an operating voltage for the first region.

4. The battery management system according to claim 1, wherein the third region is disposed at a predetermined third insulation distance from the second region, in which the third insulation distance is shorter than each of the first insulation distance and the second insulation distance.

5. The battery management system according to claim 3, wherein the voltage converters for the relay region and the first region are isolated-type voltage converters,
wherein the voltage converter for the relay region is disposed between the second region and the relay region that face each other through the second insulation distance, and
wherein the voltage converter for the first region is disposed between the relay region and the first region that face each other through the first insulation distance.

6. The battery management system according to claim 1, wherein the battery includes two or more battery cells electrically connected to each other in series, and
wherein the voltage measuring unit measures a voltage applied across both ends of the electrically series connected battery cells.

7. The battery management system according to claim 1, wherein the voltage measuring unit includes a voltage dividing resistor part to divide a voltage applied across terminals of the battery and an analog/digital converter to convert analog data on the voltage divided by the voltage dividing resistor part into a digital signal, and
wherein the analog/digital converter and the first insulating device are incorporated in a single package of an integrated circuit for battery voltage measurement.

8. The battery management system according to claim 1, wherein the voltage converter for the first region, which converts the operating voltage for the relay region into the operating voltage for the first region, is incorporated in an insulating device integrated circuit that contains the first insulating device.

9. The battery management system according to claim 1, wherein in the circuit board, the first region and the relay region are disposed at one recess on an outline of the second region, and
wherein a fourth insulation distance that is a shortest interval between the first region and the second region is longer than each of the first insulation distance and the second insulation distance.

10. The battery management system according to claim 9, wherein the fourth insulation distance is longer than a sum total of the first insulation distance and the second insulation distance.

* * * * *